US012756700B2

(12) United States Patent
Mohanan et al.

(10) Patent No.: US 12,756,700 B2
(45) Date of Patent: Oct. 6, 2026

(54) CONSERVING COMPUTING RESOURCES VIA APPLICATION-LEVEL AUTHENTICATION OF ACTION EXECUTION REQUESTS

(71) Applicant: Truist Bank, Charlotte, NC (US)

(72) Inventors: Murali Mohanan, Marietta, GA (US); Deepak Janke, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 63 days.

(21) Appl. No.: 18/748,935

(22) Filed: Jun. 20, 2024

(65) Prior Publication Data

US 2025/0392472 A1 Dec. 25, 2025

Related U.S. Application Data

(63) Continuation of application No. 18/748,803, filed on Jun. 20, 2024.

(51) Int. Cl.
*H04L 29/06* (2006.01)
*H04L 9/32* (2006.01)
*H04L 9/40* (2022.01)

(52) U.S. Cl.
CPC ........ *H04L 63/0823* (2013.01); *H04L 9/3247* (2013.01); *H04L 63/0853* (2013.01); *H04L 63/105* (2013.01)

(58) Field of Classification Search
CPC ... H04L 9/3247; H04L 63/0853; H04L 9/006; H04L 9/0844; H04L 9/32; H04L 9/3263; H04L 9/3273; H04L 9/3265; H04L 9/3268; H04L 41/0253; H04L 63/08; H04L 63/0823; H04L 63/083; H04L 63/0869; H04L 65/1108; H04L 67/02; H04L 2463/082; H04M 2203/6072; H04N 21/25; H04N 21/25816; H04N 21/25875; H04N 21/4753; H04N 21/4782; H04N 21/8173; H04N 2201/3235; H04N 2201/3236; H04N 2201/3239; H04N 2201/324; G06F 16/80;
(Continued)

(56) References Cited

U.S. PATENT DOCUMENTS 12,443,749 B2 * 10/2025 Kirsch .................... G06F 21/31
2023/0135054 A1 * 5/2023 Abershitz ........... H04L 63/0884
726/1

* cited by examiner

*Primary Examiner* — Edward Zee
*Assistant Examiner* — Leynna Truvan
(74) *Attorney, Agent, or Firm* — Nicholas Martin; Greenberg Traurig, LLP

(57) ABSTRACT

A system for conserving computing and memory resources and enhancing security by performing application-level multifactor level authentication of a client requesting execution of an action by the system. A request to execute an action sent by the client and received by an action execution application of the system may include compiled client authentication information. The compiled client authentication information may comprise at least a client digital certificate and client login credentials that are unique to the action execution application. The action execution application can authenticate the client relative to the requested action by validating the received client digital certificate against a stored set of previously validated digital certificates, in addition to validating the received client login credentials against a stored set of previously validated login credentials. In response to authenticating the client, the action execution application may execute the requested action.

20 Claims, 3 Drawing Sheets

(58) Field of Classification Search
CPC ...... G06F 16/901; G06F 16/903; G06F 16/95; G06F 16/951; G06F 16/953; G06F 16/958; G06F 21/128; G06F 2221/2119; G06F 21/30; G06F 21/445; G06F 21/45; G06F 2211/003; G06Q 20/3674; G06Q 20/388; G06Q 20/4097; H04H 60/23; H04W 12/06; G03G 21/1892
See application file for complete search history.

CONSERVING COMPUTING RESOURCES VIA APPLICATION-LEVEL AUTHENTICATION OF ACTION EXECUTION REQUESTS

CROSS-REFERENCE TO RELATED APPLICATIONS

This application is a continuation of U.S. patent application Ser. No. 18/748,803, filed Jun. 20, 2024, titled "CONSERVING COMPUTING RESOURCES VIA APPLICATION-LEVEL AUTHENTICATION OF ACTION EXECUTION REQUESTS," the entirety of which is incorporated herein by reference.

TECHNICAL FIELD

The present disclosure relates generally to computing infrastructure, and more particularly, although not exclusively, to conserving computing resources and enhancing operational efficiency and security by performing multifactor authentication of requested actions at an application level.

BACKGROUND

An electronic communication may include identity authentication of one or both of the parties to the communication. For example, in the case where an initiating party sends a request to execute an action to a receiving party, authentication of the identity of the initiating party may be performed before the receiving party is allowed to execute the action. Systems for executing requested actions may involve specialized equipment and processes, such as a hardware and software middleware layer, and may rely solely on a digital certificate for identity authentication. Such a design adds complexity, cost, and maintenance requirements to the system, and may not be conducive to a cloud-based architecture where various applications execute on a physical server or a virtual server of a cloud service provider rather than at a traditional data center. Additionally, reviewing and executing requested actions using the system can consume significant memory and processor resources, can increase the time required to execute requested actions, may rely at least in part on third party systems, and may render the system vulnerable to fraudulent requests.

SUMMARY

According to one example of the present disclosure, a system may include a processor, and a memory that is communicatively coupled to the processor and includes instructions that are executable by the processor to cause the processor to perform operations. The operations may include receiving, from a client device via a network, at an action execution application having action execution functionality defined by the instructions in the memory, a request to execute an action. The request may include compiled client authentication information comprising at least a client digital certificate and client login credentials unique to the action execution application. The operations may also include separating, by the action execution application, the client digital certificate from the client login credentials. The operations may additionally include authenticating the client. Authenticating the client may include validating, by the action execution application, the client digital certificate by comparing the client digital certificate with a stored set of validated digital certificates, and validating, by the action execution application, the client login credentials by comparing the client login credentials with a stored set of validated login credentials. The operations may further include executing the action by the action execution application in response to authenticating the client.

According to a further example of the present disclosure, a computer-implemented method may include receiving, at an action execution application having action execution functionality defined by the instructions in a memory, from a client device via a network, a request to execute an action. The request may include compiled client authentication information including at least a client digital certificate and client login credentials unique to the action execution application. The method may also include separating, by the action execution application executed by a processor, the client digital certificate from the client login credentials. The method may additionally include authenticating the client by validating, by the action execution application executed by the processor, the client digital certificate by comparing the client digital certificate with a stored set of validated digital certificates, and validating, by the action execution application executed by the processor, the client login credentials by comparing the client login credentials with a stored set of validated login credentials. The method may further include, in response to authenticating the client, causing, by the processor, the action to be executed by the action execution application.

According to another example of the present disclosure, a non-transitory computer readable medium may contain instructions that are executable by a processor to cause the processor to perform operations. The operations may include receiving, from a client device via a network, at an action execution application having action execution functionality defined by the instructions in the memory, a request to execute an action. The request may include compiled client authentication information comprising at least a client digital certificate and client login credentials unique to the action execution application. The operations may also include separating, by the action execution application, the client digital certificate from the client login credentials. The operations may additionally include authenticating the client. Authenticating the client may include validating, by the action execution application, the client digital certificate by comparing the client digital certificate with a stored set of validated digital certificates, and validating, by the action execution application, the client login credentials by comparing the client login credentials with a stored set of validated login credentials. The operations may further include executing the action by the action execution application in response to authenticating the client.

DETAILED DESCRIPTION

Figure 1:
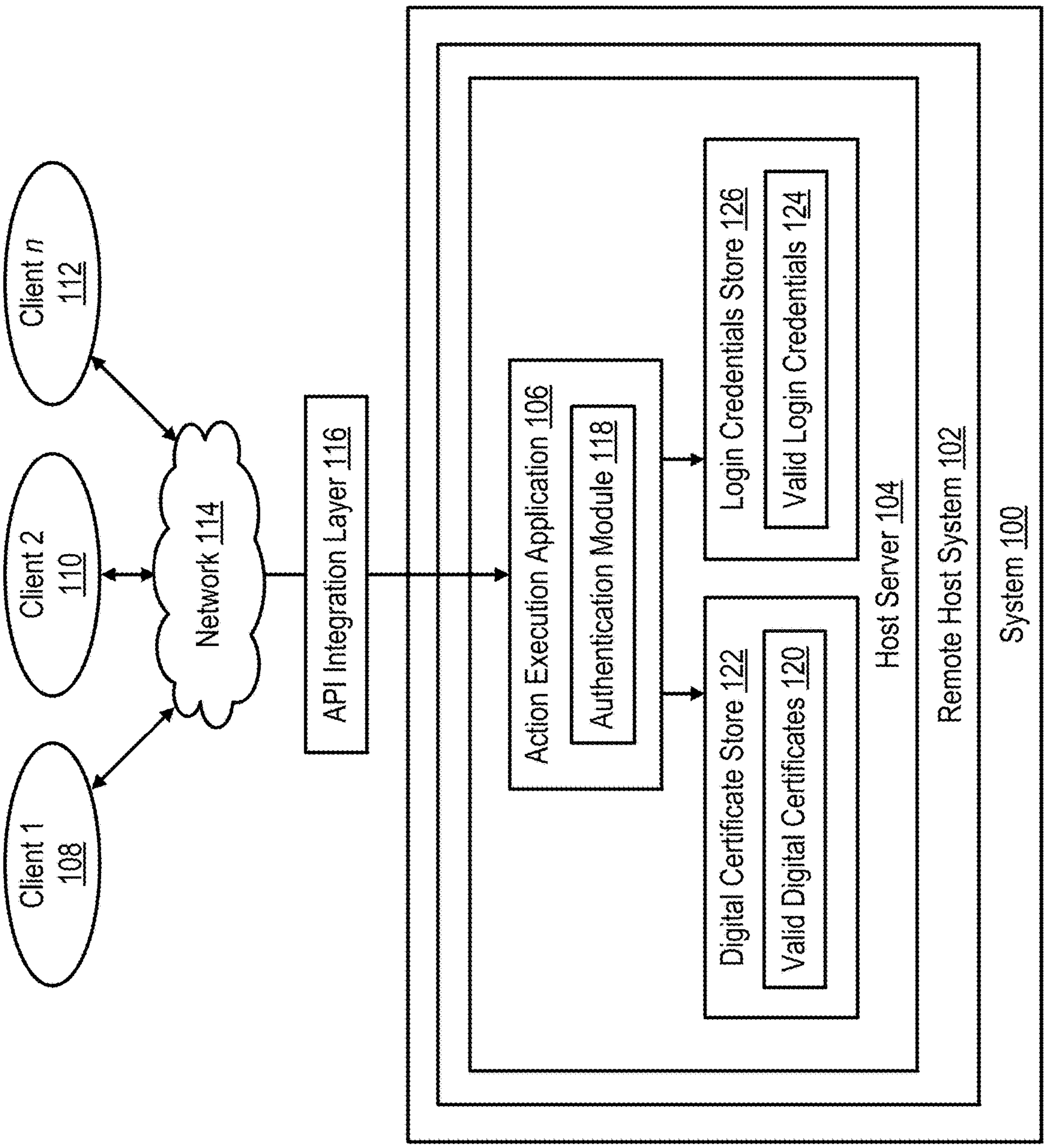
FIG. 1 is a block diagram of a system for performing application-level multifactor authentication of action execution requests, according to an example of the present disclosure.

Certain aspects and features of the present disclosure relate to a system for conserving computing resources, reducing processing time, and improving security relative to received requests to execute actions. Requests to execute actions may be received by the system from an initiating party (client) over a network. Requests to execute actions may be received by the system from a client device over one or more different channels. The system may be a distributed system. In some examples, the system may be a cloud-based system where various applications, such as action execution applications run on physical or virtual servers of a cloud service provider.

An action execution application may be computer-executable code, such as a program or software, that can understand the format and content of incoming requests to execute actions. The action execution application may authenticate the client requesting execution of the action, such as by validating multi-factor authentication credentials provided by the client. In some examples, the action execution application may, upon authentication of the requesting client, execute the action or otherwise cause the action to be executed by another application, another computing system, etc. The client may be associated with a frontend of the system, while an action execution application may be associated with a backend of the system.

A client device can be, for example, a server, a personal computer, a laptop computer, a tablet, a smart phone, etc. In some examples, a request to execute an action may be submitted using a client device that is communicatively coupled to the system through the Internet. In such an example, communications between the client device and the system can be conducted using a web browser, and may employ various cryptographic communication protocols.

A request to execute an action may include compiled client authentication information. Compiling client authentication information and including the compiled client authentication information in a request can conserve processor and memory resources, and may improve efficiency. For example, including compiled client authentication information in a request to execute an action, may minimize or eliminate the need for the system to communicate with or retrieve data from external systems, or may reduce the number of required communications between the system and the client.

Client authentication information may include, among other things, a client digital certificate and client login credentials, which may be uniquely usable to authenticate the client to the system relative to a request to execute an action. The client digital certificate may be a private digital certificate. In some examples, the client digital certificate and the client login credentials can be fully validated within the system, such as by the action execution application that is also usable to execute the action upon successful authentication of the client. In this regard, the system may include a stored set of validated client login credentials and a stored set of validated client digital certificates, which may be public digital certificates in some examples. The client authentication information provided in a request to execute the action may be compared with the stored validated client digital certificates and the stored validated client login credentials. This can also save processor and memory resources and improve efficiency, as the system does not need to communicate with or rely on third party systems (e.g., certificate authorities) when validating the client authentication information. Requiring authentication of both a client digital certificate and client login credentials (i.e., multifactor authentication) can also improve security, such as by reducing the ability of a bad actor to fraudulently cause the execution of an action using a stolen client digital certificate.

In one example, a computing system for executing client-requested actions while employing application-level multi-factor client authentication may be a wire payment processing system of a financial institution. The wire payment processing system may be deployed in a cloud-computing environment where one or more wire payment initiation applications execute on one or more physical or virtual servers of a cloud services provider. Communications between a client and the wire payment processing system may be web-based communications that occur over the Internet and are initiated by the client using a web browser. A wire payment initiation application of the wire payment processing system may manage both a client authentication portion and a wire transfer execution portion of the wire transfer process. For example, when the wire payment processing system receives a request to initiate a wire payment (a wire transfer request), the wire payment initiation application can authenticate the user and authorize the requested wire transfer by evaluating a client digital certificate and client login credentials that are unique to the action execution application and were provided by the client with the wire transfer request. In response to authenticating the client, the wire payment initiation application can execute the wire transfer or can cause another application or computing system to execute the wire transfer. Executing the wire transfer can cause a transfer of funds from an account associated with the client to an account associated with a receiving party identified in the wire transfer request. The client may be a customer of the financial institution or may be another financial institution.

These illustrative examples are provided to introduce the reader to the general subject matter discussed herein, and are not intended to limit the scope of the disclosed concepts. In the following description, various additional features and examples are described with reference to the drawings in which like numerals indicate like elements. Various implementations may be practiced without these specific details, and features can be combined together. The figures and description are not intended to be restrictive.

FIG. 1 is a block diagram of a computing environment within which one example of a system 100 can execute client-requested actions while employing application-level multifactor client authentication. Application-level authentication can be used to perform a client authentication operation within the application itself rather than at lower levels of a network stack, such as typically occurs with SSL/TLS or similar communications.

Application-level authentication can be accomplished in several ways. In one example, the system 100 may implement application-level authentication in the form of role-based access control (RBAC). In RBAC type application-level authentication, client authentication and subsequent client access to application programming interfaces (APIs) of the application can be based on user roles. In another example, the system 100 may implement application-level authentication in the form of attribute-based access control (ABAC). In ABAC type application-level authentication, client authentication and subsequent client access to APIs of the application can be based on the attributes of the client requesting access to the application. The attributes may include, for example, client role or department, client location, time of day, device type used by the client, etc. The attributes of a client can be checked against adopted rules that are associated with the system 100 and can specify what client attributes must be present in order to grant a client access to the application.

Regardless of the specific type of application-level authentication selected, the system 100 can utilize application-level authentication to limit client access to only particular and predetermined application resources that may vary by client and may be dynamically changed when needed. Because application-level authentication can allow for finer-grain control over access to resources within an application, it may also be possible to use of custom authentication logic that is specific to a given application. Application-level authentication may also be more convenient for clients, as application-level authentication can allow a client to safely access various application resources after a single login instead of requiring repeated logins. Application-level authentication can also replace server-level or other network-level authentication, and may resultantly eliminate the need for an additional hardware (server) and software middleware layer for performing authentication operations.

The application-level authentication utilized by the system 100 may be multifactor client authentication. When multifactor client authentication is utilized, a client will need to submit at least two forms of authentication information to the system 100 instead of only one, and each form of authentication will need to be validated by the system 100 in order to authenticate and authorize the client. Various combinations of authentication information may be provided, including combinations of digital certificates, biometric information, and login credentials. In one example, a client may be authenticated by submitting to the system 100 both a valid digital certificate and a valid (static) username and associated password that are unique to the application execution application of the system 100 for which the client is seeking authentication.

In some examples, the system 100 may be a computing system including various processing and other hardware and software or application components. The system 100 may be a standalone computing system, a server, a distributed computing system having multiple servers, virtual machines, etc., or a cloud-based system hosted by a cloud services provider and including one or more physical or virtual servers.

In some examples, such as a cloud-based example, the system 100 may include a remote host system 102. In other examples, the system 100 may be a part of the remote host system 102. In some examples, the system 100 may include at least a portion of the remote host system 102. In still other examples, the client, or at least a client device, may be a part of the system 100. The remote host system 102 may include a host server 104. In examples where the remote host system 102 is a cloud-based system, the host server 104 may be, for example, a physical or virtual server of the cloud-based remote host system 102. One or more applications may run on the host server 104. One such application may be an action execution application 106 that is configured to, among other things, authenticate clients and execute requested actions.

Requests to execute actions may be received by the system from a number of clients 108, 110, 112. Requests to execute actions may be transmitted to the system 100 via client devices over a number of channels, the selection of which may depend on the nature of the action to be executed. As illustrated, the clients 108, 110, 112 can communicate with the system 100 via client devices over a network 114.

In some examples, the network 114 can be a local area network (LAN), a wide-area network (WAN) such as the Internet, an institutional network, cellular or other wireless networks, virtual networks such as an intranet or an extranet, etc.

In the example of FIG. 1, the network 114 is the Internet, and the clients 108, 110, 112 may communicate with the system 100 via client devices over web-based channels. For example, a client computing device may open a web browser to establish a connection with the system 100. Communications between the web browser and the system 100 may employ various cryptographic communication protocols. For example, communications between the web browser and the system 100 may employ a hypertext transfer protocol secure (HTTPS) communication protocol in conjunction with either secure socket layer (SSL) or mutual transport layer security (mTLS) cryptographic protocols for communication security.

A request to execute an action received from a device of a client 108, 110, 112 may include compiled client authentication information. The compiled client authentication information preferably includes multifactor client authentication information. In at least some examples, the compiled client authentication information may include a client digital certificate in conjunction with client login credentials which may be, for example, a static username and associated password. A token or biometric data may also be usable as login credentials in other examples. One or both of the client digital certificate and the client login credentials may be uniquely usable to authenticate a client 108, 110, 112 to the system 100 relative to a request to execute an action.

In some examples, the client digital certificate and the client login credentials may be sent to the system 100 at some point during an SSL/mTLS handshake that occurs between the system 100 and the devices of the clients 108, 110, 112, or otherwise prior to the system 100 acting on a request to execute an action. As shown, the client digital certificate and the client login credentials may be sent to the system 100 by an intermediary API integration layer 116 that can facilitate a connection and communications between a client application and an application (e.g., the action execution application 106) of the system 100. While the SSL/mTLS handshake may determine that the client 108, 110, 112 devices and the system 100 are authorized to generally communicate with each other, the client digital certificate and the client login credentials can be collectively used to further establish that a given client 108, 110, 112 is authorized to request execution of a particular action.

By using certain aspects of a system according to some examples, the use of a hardware and software middle layer used in other systems to communicate with third party systems can be avoided for authentication. In such other systems, a middleware layer can be interposed between requestors and a backend of the system where requested actions are processed. The middleware layer may include, for example, a web server or an application server and associated software that is configured to handle communication and authentication tasks related to a received request to execute an action, but not actual execution of the requested action. Such system middleware layers communicate with third party systems (e.g., certificate authorities) when authenticating requestors via a digital certificate, and may employ certificate name filtering or other techniques to avoid storing and analyzing complete digital certificates. Such a design adds complexity, cost, and maintenance requirements to a requested action execution system. Such a system design may also be dependent on communication with and the proper functionality of third party systems, at least for purposes of client authentication. Such a system design can also result in higher memory and processor resource consumption, and may increase the time required to execute requested actions because all received requests must go through the middleware layer prior to being relayed to a backend portion of the system for actual action execution.

Examples according to some aspects of the present disclosure can eliminate the client-authenticating middleware layer. For example, instead of relying on third parties or third-party systems to authenticate a client 108, 110, 112 that has sent a request to execute an action to the system 100, client authentication can be performed by the action execution application 106 running on the host server 104. More specifically, the client digital certificate and the client login credentials included in a given request to execute an action can be fully validated within the system 100 using the action execution application 106, which is also usable to execute the action upon successful authentication of the client.

In some examples, the action execution application 106 may include or may otherwise be communicatively coupled with an authentication module 118 that is usable to authenticate the identity of a client 108, 110, 112 from which the system 100 has received a request to execute an action. The authentication module 118 may be code within the action execution application 106 that is configured to understand and analyze the client authentication information included in the request.

In operation, the action execution application 106, such as through the authentication module 118, can first separate a client digital certificate from client login credentials included in compiled client authentication information received with a request to execute an action. The authentication module 118 of the action execution application 106 can authenticate the client 108, 110, 112 by validating the client digital certificate against digital certificates that are known to be valid and separately validating the client login credentials against login credentials that are known to be valid. Particularly, the action execution application 106 can validate a received client digital certificate by comparing the received client digital certificate with a set of previously validated digital certificates 120 saved in a digital certificate store 122. Likewise, the authentication module 118 of the action execution application 106 can validate received client login credentials by comparing the received client login credentials with a set of previously validated login credentials 124 saved in a login credentials store 126. Only after both the client digital certificate and the client login credentials received with the request are both validated and determined to be associated with the same client is the client authentication process complete. Upon authentication of the client 108, 110, 112, the authentication module 118 may identify the request to execute the action as a valid request to the action execution application 106. In response to authenticating the client 108, 110, 112, the action execution application 106 can execute the requested action.

The digital certificate store 122 and the client login credentials store 126 may reside on the host server 104 or the elsewhere on the remote host system 102. Alternatively, the digital certificate store 122 and the client login credentials store 126 may be resident in a remote database. In any case, the action execution application is communicatively coupled to the digital certificate store 122 and the client login credentials store 126.

In some examples, a client 108, 110, 112 transmitting a request to execute an action to the system 100 may be an entity and the system 100 receiving the request may be owned by or otherwise associated with another entity. For example, the client 108, 110, 112 may be a first financial institution, the request to execute an action may be a request to initiate a wire payment, and the system 100 may be a wire payment system of a second financial institution. In such a case, a client digital certificate and client login credentials may be stored on a client device that is used to generate and transmit a request to execute an action to the system 100. Alternatively, the client device may be configured to retrieve the client digital certificate and client login credentials from a remote data store for inclusion in the request to execute an action. In some examples, a client device may include an application or other software that is provided by the owner or operator of the system 100 and is configured to cause the client device to compile and transmit the client authentication information (e.g., client digital certificate and client login credentials) with the request to execute an action. In such an example, a client, a client device, or an application running on a client device, may be a part of the system 100.

Figure 2:
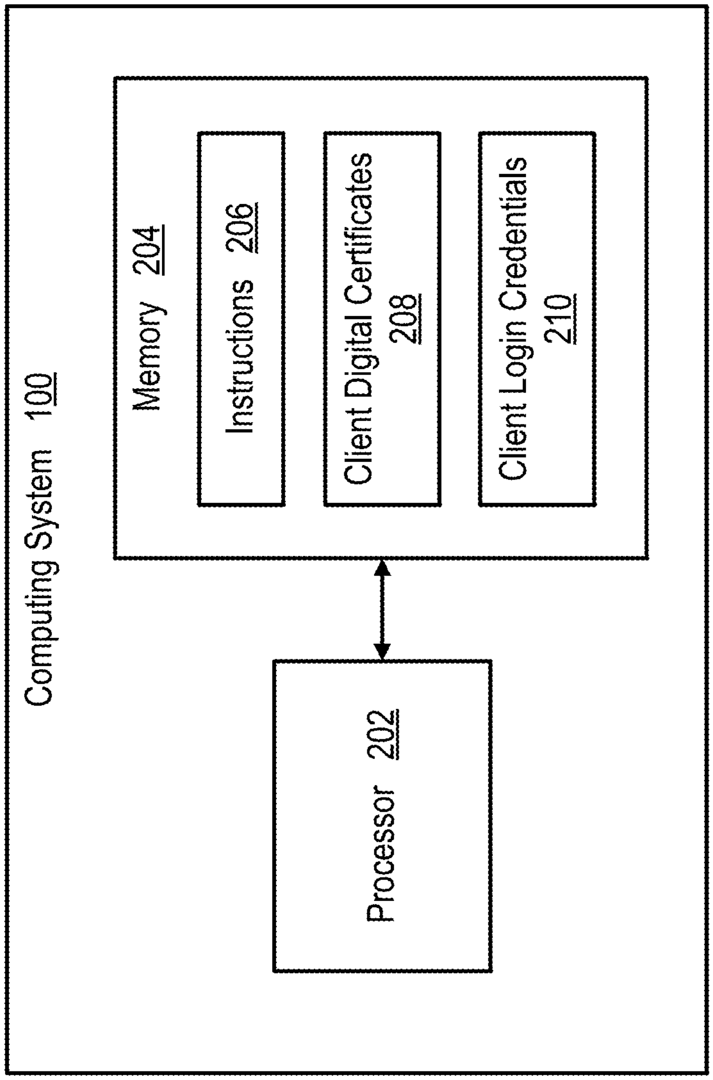
FIG. 2 is a block diagram of various components of a computing system that can be used to perform application-level multifactor authentication of action execution requests, according to an example of the present disclosure.

FIG. 2 is a block diagram illustrating various components of one example of a computing system, such as the computing system 100 of FIG. 1, that is usable to perform application-level multifactor authentication of action execution requests. As illustrated, the computing system 100 may include a processor 202. The processor 202 can include one processing device or multiple processing devices. Non-limiting examples of the processor 202 include a Field-Programmable Gate Array (FPGA), an application-specific integrated circuit (ASIC), a microprocessor, etc. A memory 204 may be communicatively coupled to the processor 202. The memory 204 can include instructions that are executable by the processor 202 to cause the processor 202 to perform operations. In some examples, the instructions 206 can include processor-specific instructions generated by a compiler or an interpreter from code written in a suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can be a non-transitory computer-readable medium from which the processor 202 can read the instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 202 can read the instructions 206.

In one example, the memory 204 may include a set of validated digital certificates 208 and a set of validated login credentials 210. The set of validated digital certificates 208 and the set of validated login credentials 210 can be used by the computing system 100 to authenticate a client and to ensure that the client is authorized to request execution of a given action. For example, the computing system 100 may authenticate a client by validating a received client digital certificate and received client login credentials against the respective validated digital certificates 208 and validated login credentials 210 in the memory 204.

Figure 3:
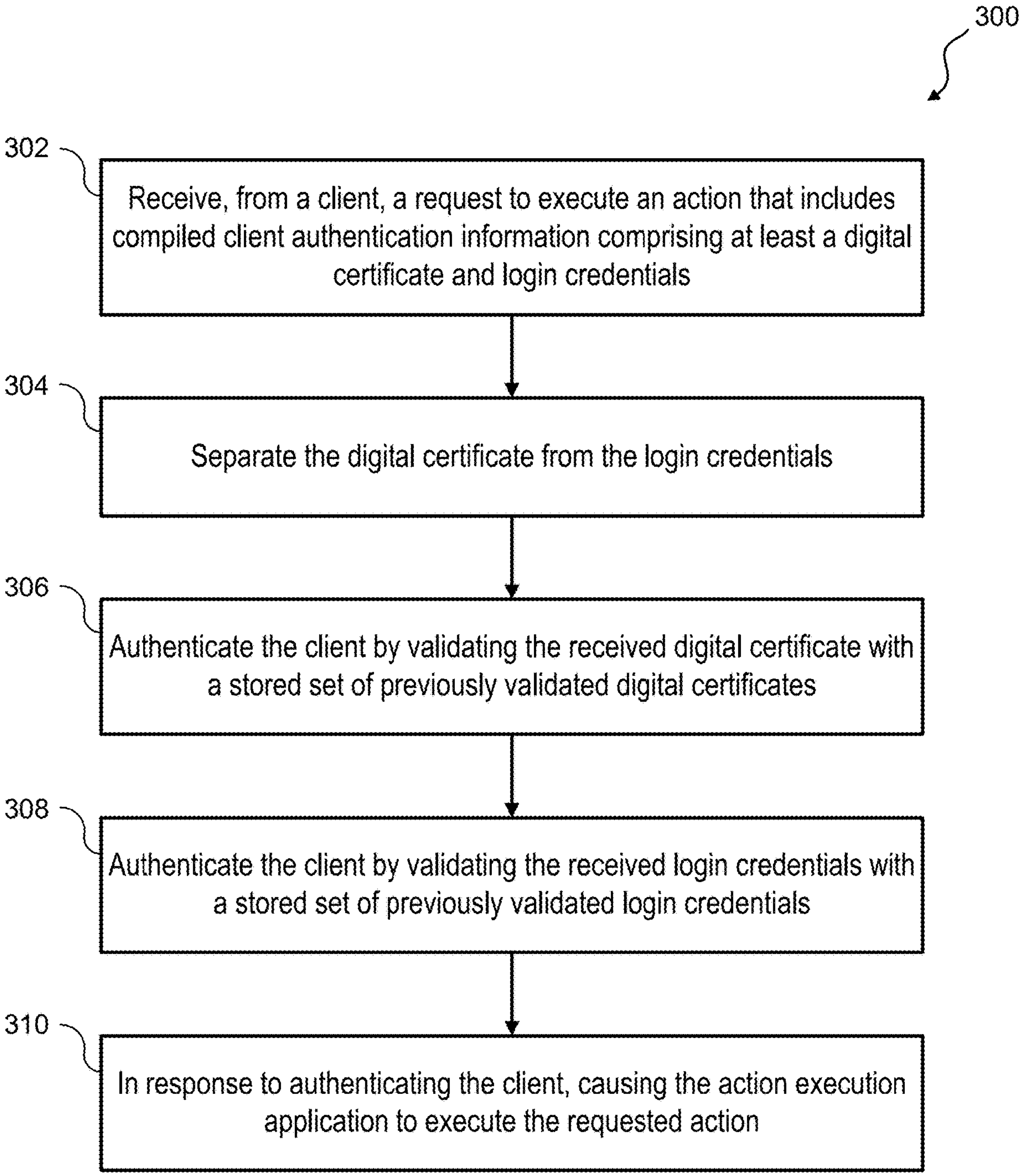
FIG. 3 is a flowchart of a computer-implemented method for performing application-level multifactor authentication of action execution requests, according to one example of the present disclosure.

FIG. 3 is a flowchart 300 of one example of a computer-implemented method for performing application-level multifactor authentication of action execution requests. Accordinging to this example of the computer-implemented method, a request to execute an action sent by a client device over a network is received by an action execution application, as indicated in block 302. The action execution application may run on an action execution system of an entity. In some examples, the client and the entity may both be financial institutions and the requested action may be initiation of a wire payment. In some examples, the action execution system may be a remote host (computing) system, such as a system hosted by a cloud-services provider. The remote computing system may include a host server, which can be a physical or virtual server. The action execution application may be executed by a processor, which may be a component of the remote host system.

As also indicated in block 302, the request includes compiled client authentication information comprising at least a client digital certificate and client login credentials that are unique to the action execution application. The client digital certificate may be separate and apart from a digital certificate(s) used by the client and the system hosting the action execution application to verify that communications therebetween are permitted. Rather, the client digital certificate is separately usable to authenticate the client to the action execution application for the specific purpose of verifying that the client is authorized to execute the action identified in the received request. The client login credentials may be static login credentials such as a username and an associated password. In other examples, it may be possible to employ other types of login credentials, such as dynamic tokens or biometric data. In some examples, the client digital certificate and the client login credentials may be provided to the action execution application during an SSL or mTLS handshake portion of web-based communications between the client device and the action execution application. In any case, the client digital certificate and the client login credentials are components of an application-level multifactor authentication process that must be completed before the action execution application will execute a requested action.

In block 304 of FIG. 3, the client digital certificate and the client login credentials received in the compiled client authentication information are separated from each other by the action execution application executed by a processor. In some examples the processor may be a component of a remote host system, such as a host server, on which the action execution application runs.

Blocks 306 and 308 collectively disclose two components of authenticating the client relative to execution of the requested action using application-level multifactor authentication. A first component of the application-level multifactor authentication process is disclosed in block 306, and includes validating the received client digital certificate by executing the action execution application by the processor to cause the action execution application to compare the client digital certificate with a stored set of previously validated digital certificates. If the client digital certificate matches one of the stored digital certificates then the client digital certificate is a valid digital certificate and the first component of the multifactor authentication process is satisfied. A second component of the application-level multifactor authentication process is disclosed in block 308, and includes validating the received client login credentials by executing the action execution application by the processor to cause the action execution application to compare the client login credentials with a stored set of previously validated login credentials. If the client login credentials match a stored set of login credentials then the client login credentials are valid login credentials and the second component of the multifactor authentication process is satisfied. Only after the client digital certificate and the client login credentials are both validated and determined to be associated with the same client is the client authentication process considered to be complete.

As indicated in block 310, in response to authenticating the client, the processor can cause the action execution application to execute the requested action. In some examples, execution of the action may be accompanied by a notification of the same to the client.

In one example, a computing system for executing client-requested actions while employing application-level multifactor client authentication may be a wire payment processing system of a financial institution. The wire payment processing system may be deployed in a cloud-computing environment where one or more wire payment initiation applications execute on one or more physical or virtual servers of a cloud services provider. Communications between a client device and the wire payment processing system may be web-based communications that occur over the Internet and are initiated by the client device using a web browser. A wire payment initiation application of the wire payment processing system may manage both a client authentication portion and a wire transfer execution portion of the wire transfer process. For example, when the wire payment processing system receives a request to initiate a wire payment (a wire transfer request), the wire payment initiation application can authenticate the user and authorize the requested wire transfer by evaluating a client digital certificate and client login credentials that are unique to the action execution application and were provided by the client with the wire transfer request. In response to authenticating the client, the wire payment initiation application can execute the wire transfer or can cause another application or computing system to execute the wire transfer. Executing the wire transfer can cause a transfer of funds from an account associated with the client to an account associated with a receiving party identified in the wire transfer request. The client may be a customer of the financial institution or may be another financial institution.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a network;

an intermediary application programming interface (API) integration layer communicatively coupled to the network;

a computing system comprising a processor and a memory communicatively coupled to the processor, the computing system communicatively coupled to the intermediary API integration layer to receive, over one or more channels and via the intermediary API integration layer, communications from client applications executing on a plurality of client devices;

a digital certificate store comprising a set of previously validated digital certificates and stored in the memory of the computing system;

a login credentials store comprising a set of previously validated login credentials and stored in the memory of the computing system;

where the memory of the computing system further includes instructions that are executable by the processor of the computing system to cause the computing system to perform operations comprising:

receiving, from a client device of the plurality of client devices, at an application of interest residing on the computing system, via a web browser connected to the intermediary API integration layer through the network and employing a cryptographic protocol, a request for the application of interest to execute an action, the request including compiled multifactor client authentication information that is unique to the application of interest;

authenticating the client device as being permitted to make the request in part by executing a code-based authentication module of the application of interest to:

compare, at the application of interest, a client digital certificate of the compiled multifactor client authentication information with the set of previously validated digital certificates that resides in the digital certificate store of the computing system memory and is accessible by the authentication module, compare, at the application of interest, client login credentials of the compiled multifactor client authentication information with the set of previously validated login credentials that resides in the login credentials store of the computing system memory and is accessible by the authentication module, validate the client digital certificate when the client digital certificate matches a digital certificate of the set of previously validated digital certificates in the digital certificate store, and validate the client login credentials when the client login credentials match login credentials of the set of previously validated login credentials in the login credentials store; and in response to authenticating the client device by the code-based authentication module, executing the action by the application of interest.

2. The system of claim 1, wherein the authentication module is located within the application of interest and is executable by the processor of the computing system to authenticate the client device using role-based access control authentication or attribute-based access control authentication.

3. The system of claim 1, wherein the computing system is a cloud-based remote host system that includes a host server implemented as a physical server that includes the processor and the memory or as a virtual server that includes allocated access to the processor and the memory.

4. The system of claim 1, wherein:

the cryptographic protocol is a secure socket layer (SSL) or a mutual transport layer security (mTLS) cryptographic protocol; and the compiled multifactor client authentication information is transmittable to the computing system during an SSL or mTLS handshake between the client device and the intermediary API integration layer.

5. The system of claim 1, wherein executing the action by the application of interest comprises causing the action to be executed by another application or another computing system.

6. The system of claim 1, wherein the compiled multifactor client authentication information is stored on the client device or at a remote data store that is accessible by the client device.

7. The system of claim 1, wherein the request to execute the action is a request to initiate a wire payment and the application of interest is a wire payment initiation application, the wire payment being executable by the application of interest to cause a transfer of funds from an account associated with a user of the client device to an account associated with a receiving party identified in the request to initiate a wire payment.

8. A computer-implemented method comprising:

communicatively coupling an intermediary application programming interface (API) integration layer between a network and a computing system;

receiving, by a processor of the computing system, from a client device over a channel of one or more channels and via a web browser connected to the intermediary API integration layer through the network and employing a cryptographic protocol, a request to execute an action at an application of interest residing on the computing system, the request including compiled multifactor client authentication information that is unique to the application of interest;

authenticating the client device as being permitted to make the request in part by executing, by the processor, a code-based authentication module of the application of interest to:

compare, at the application of interest, a client digital certificate of the compiled multifactor client authentication information with a set of previously validated digital certificates that is stored in a digital certificate store of a memory of the computing system and accessible by the authentication module, compare, at the application of interest, client login credentials of the compiled multifactor client authentication information with a set of previously validated login credentials that is stored in a login credentials store of the memory of the computing system and accessible by the authentication module, validate the client digital certificate when the client digital certificate matches a digital certificate of the set of previously validated digital certificates stored in the digital certificate store, and validate the client login credentials when the client login credentials match login credentials of the set of previously validated login credentials stored in the login credentials store; and in response to authenticating the client device by the code-based authentication module of the computing system, executing the action by the application of interest.

9. The computer-implemented method of claim 8, wherein the processor executes the authentication module to authenticate the client using role-based access control authentication or attribute-based access control authentication.

10. The computer-implemented method of claim 8, wherein the computing system is a cloud-based remote host system that includes a host server implemented as a physical server that includes the processor and the memory or as a virtual server that includes allocated access to the processor and the memory.

11. The computer-implemented method of claim 8, wherein the cryptographic protocol is a secure socket layer (SSL) or a mutual transport layer security (mTLS) cryptographic protocol.

12. The computer-implemented method of claim 11, wherein the compiled multifactor client authentication information is transmitted to the computing system during an SSL or mTLS handshake between the client device and the intermediary API integration layer.

13. The computer-implemented method of claim 8, wherein the application of interest causes the action to be executed by another application or another computing system.

14. The computer-implemented method of claim 8, wherein the request to execute an action is a request to initiate a wire payment, and the application of interest is a wire payment initiation application that executes the wire payment to cause a transfer of funds from an account associated with a user of the client device to an account associated with a receiving party identified in the request to initiate a wire payment.

15. A non-transitory computer-readable medium comprising instructions that are executable by a processor of a computing system for causing the processor to perform operations comprising:

receiving, from a client device, at an application of interest residing on the computing system, over a channel of one or more channels and via a web browser connected to an intermediary API integration layer communicatively coupled between a network and the computing system and employing a cryptographic protocol, a request to execute an action at the application of interest, the request including compiled multifactor client authentication information that is unique to the application of interest;

authenticating the client device as being permitted to make the request in part by executing a code-based authentication module of the application of interest to:

compare, at the application of interest, a client digital certificate of the compiled multifactor client authentication information with a set of previously validated digital certificates that is stored in a digital certificate store of a memory of the computing system and accessible by the authentication module, compare, at the application of interest, client login credentials of the compiled multifactor client authentication information with a set of previously validated login credentials that is stored in a login credentials store of the memory of the computing system and accessible by the authentication module, validate the client digital certificate when the client digital certificate matches a digital certificate of the set of previously validated digital certificates stored in the digital certificate store, and validate the client login credentials when the client login credentials match login credentials of the set of previously validated login credentials stored in the login credentials store; and in response to authenticating the client device by the code-based authentication module of the computing system, executing the action by the application of interest.

16. The non-transitory computer-readable medium of claim 15, wherein the authentication module is located within the application of interest and is executable by the processor to authenticate the client device using role-based access control authentication or attribute-based access control authentication.

17. The non-transitory computer-readable medium of claim 15, wherein the computing system is a cloud-based remote host system that includes a host server implemented as a physical server that includes the processor and the memory or as a virtual server that includes allocated access to the processor and the memory.

18. The non-transitory computer-readable medium of claim 15, wherein:

the cryptographic protocol is a secure socket layer (SSL) or a mutual transport layer security (mTLS) cryptographic protocol; and the compiled multifactor client authentication information is transmittable to the computing system during an SSL or mTLS handshake between the client device and the intermediary API integration layer.

19. The non-transitory computer-readable medium of claim 15, wherein executing the action by the application of interest comprises causing the action to be executed by another application or another computing system.

20. The non-transitory computer-readable medium of claim 15, wherein the request to execute an action is a request to initiate a wire payment and the application of interest is a wire payment initiation application, the wire payment being executable by the application of interest to cause a transfer of funds from an account associated with a user of the client device to an account associated with a receiving party identified in the request to initiate a wire payment.

* * * * *